United States Patent
Hinrichs et al.

(10) Patent No.: US 8,070,218 B2
(45) Date of Patent: Dec. 6, 2011

(54) ROOF LOCKING APPARATUS FOR A VEHICLE

(75) Inventors: Frank Hinrichs, Hiroshima (JP); Tomoaki Matsunobu, Hiroshima (JP)

(73) Assignee: Webasto AG (DE)

( * ) Notice: Subject to any disclaimer, the term of this patent is extended or adjusted under 35 U.S.C. 154(b) by 587 days.

(21) Appl. No.: 12/294,942

(22) PCT Filed: Mar. 28, 2007

(86) PCT No.: PCT/JP2007/056633
§ 371 (c)(1),
(2), (4) Date: Dec. 9, 2008

(87) PCT Pub. No.: WO2007/114160
PCT Pub. Date: Oct. 11, 2007

(65) Prior Publication Data
US 2010/0237662 A1    Sep. 23, 2010

(30) Foreign Application Priority Data
Mar. 28, 2006 (JP) .................................. 2006-088224

(51) Int. Cl.
*B60J 7/185* (2006.01)
(52) U.S. Cl. ..................................................... 296/224
(58) Field of Classification Search .................. 296/224, 296/214, 221, 223; 220/222; 224/324, 329
See application file for complete search history.

(56) References Cited

U.S. PATENT DOCUMENTS

| | | | | |
|---|---|---|---|---|
| 2,076,243 A | * | 4/1937 | Marshall et al. | 296/107.09 |
| 2,704,225 A | * | 3/1955 | Anschuetz et al. | 296/108 |
| 3,575,464 A | * | 4/1971 | Himka et al. | 296/117 |
| 4,441,345 A | * | 4/1984 | Guarr | 70/240 |
| 4,817,999 A | * | 4/1989 | Drew | 296/121 |
| 5,435,615 A | * | 7/1995 | Schmitz | 296/121 |
| 5,533,777 A | | 7/1996 | Kleemann et al. | |
| 5,967,590 A | * | 10/1999 | Beierl et al. | 296/107.01 |
| 6,299,234 B1 | * | 10/2001 | Seel et al. | 296/108 |
| 6,666,495 B2 | * | 12/2003 | Nania | 296/107.08 |
| 6,695,386 B1 | * | 2/2004 | Willard | 296/107.17 |
| 6,832,807 B2 | * | 12/2004 | Tezuka | 296/128 |
| 6,857,685 B2 | * | 2/2005 | Wagner | 296/107.07 |
| 7,014,245 B2 | * | 3/2006 | Yoshida et al. | 296/107.01 |

(Continued)

FOREIGN PATENT DOCUMENTS

DE    100 39 682 A1    3/2002

(Continued)

OTHER PUBLICATIONS

Extended European Search Report dated Dec. 21, 2009; Application No./ Patent No. 07740071.1-2423/ 2006141 PCT/JP2007056633.

(Continued)

*Primary Examiner* — Kiran B. Patel
(74) *Attorney, Agent, or Firm* — Studebaker & Brackett PC; Donald R. Studebaker

(57) ABSTRACT

To get out a roof (2) retracted in a storage space (7) therefrom, a link mechanism carries out pushing-out operation of push-pull cable (90) so that a grip member with the roof (2) gripped thereby is moved by an elastic force of a main spring (79) along a rail (74) from a retracted position to a gripping position, where the roof (2) is then released from gripped condition by the grip member.

6 Claims, 10 Drawing Sheets

U.S. PATENT DOCUMENTS

2004/0262943 A1 12/2004 Kubota et al.
2004/0262946 A1 12/2004 Kubota et al.

FOREIGN PATENT DOCUMENTS

| | | |
|---|---|---|
| DE | 103 13 496 A1 | 10/2004 |
| DE | 10 2007 015 706 A1 | 10/2008 |
| EP | 0 649 765 A1 | 4/1995 |
| EP | 1 595 729 A2 | 11/2005 |
| JP | 5-32057 | 4/1993 |
| JP | 2002-264658 | 9/2002 |
| JP | 2005-22449 | 1/2005 |
| JP | 1595729 A2 | 11/2005 |
| WO | 2005 084982 A1 | 9/2005 |

OTHER PUBLICATIONS

International Search Report for PCT/JP-2007/056633 dated Jun. 25, 2007.

* cited by examiner

ROOF LOCKING APPARATUS FOR A VEHICLE

TECHNICAL FIELD

The present invention relates to a roof locking apparatus for a vehicle.

BACKGROUND ART

Conventionally, a roof locking apparatus for a vehicle provided in a vehicle body and for holding a retractable roof in a storage space has been known (refer to Patent Document 1.) The roof locking apparatus for a vehicle is adapted to hold a front end of the roof in the storage space, which can prevent the roof from wobbling in the storage space.
Patent Document Japan Patent Application KOKAI Publication No. 2002-264658

DISCLOSURE OF THE INVENTION

Problems that the Invention is to Solve

To get a roof retracted in a storage space out of the storage space, there is a possibility that simply by releasing holding of a front end of the roof, the roof might tilt forward and move, or bow, due to weight or gravity center of the roof after the release. Then, the bowing may cause the roof to oscillate during movement thereof and be damaged.

The present invention has been made in light of the above and it is an object of this invention to provide a roof locking apparatus for a vehicle that can prevent the roof from bowing when the roof retracted in a storage space is gotten out of the storage space.

Means for Solving the Problems

A first invention is a roof locking apparatus for a vehicle installed in a vehicle body and holding a retractable roof in a storage space, the roof locking apparatus for a vehicle including a grip member for gripping a front end of the roof in a middle portion with respect to a vehicle width direction during the roof being retracted into said storage space, a rail provided in said vehicle body and adapted to allow said grip member to move in the up-down direction between a gripping position where said grip member grips said roof and a holding position that is defined below the gripping position by a predetermined distance away therefrom and where the grip member with said roof gripped thereby is held, a spring provided between said grip member and a bottom of said rail to extend in the up-down direction, a push-pull cable one end of which is attached to said grip member, and a cable drive mechanism to which is attached the other end of the push-pull cable for carrying out pulling and pushing-out operations of the push-pull cable, the roof locking apparatus characterized in that: to retract said roof into said storage space, after said grip member having gripped said roof in said gripping position, said push-pull cable is driven by the cable drive mechanism to carry out the pulling operation so that said grip member with said roof gripped thereby is moved by said push-pull cable against an elastic force of said spring along said rail from said gripping position to said holding position where the grip member with said roof gripped thereby is held, while on the other hand, to get the roof retracted in said storage space out of the storage space, said push-pull cable is driven by said cable drive mechanism to carry out the pushing-out operation so that the grip member with said roof gripped thereby is moved by the elastic force of said spring along said rail from said holding position to said gripping position, where then the roof is released from the gripped condition by said grip member.

Consequently, when a roof retracted in a storage space is gotten out of the storage space, a cable drive mechanism carries out a pushing-out operation so that a grip member gripping a front end of the roof is moved by an elastic force of a spring along a rail from a holding position to a gripping position defined above the holding position by a predetermined distance away therefrom, and then in the gripping position the front end of the roof is released from the gripped condition by the grip member. In other words, before the gripped condition of the roof by the grip member is released, the front end of the roof is raised. Thus, when the roof retracted in the storage space is gotten out of the storage space, the roof can be prevented from bowing. Accordingly, when the roof retracted in the storage space is gotten out of the storage space, the roof can be prevented from oscillating during movement thereof or being damaged.

A second invention is characterized in that in said first invention, said roof has a front roof, rear roof, and a rear window, and said grip member is configured to hold a front end of said front roof in a middle portion with respect to a vehicle width direction.

Consequently, when a roof retracted in a storage space is gotten out of the storage space, a front roof of the roof can be prevented from bowing.

A third invention is characterized in that in said first or second invention, said rail is provided, in said vehicle body in a region opposed to the front end of the roof in the middle portion with respect to the vehicle width direction within said storage space.

Consequently, as the rail is provided in the region opposed to the front end of the roof in the middle portion with respect to the vehicle width direction within the storage space, the grip member can reliably hold the front end of the roof in the middle portion with respect to the vehicle width direction within the storage space.

A fourth invention is characterized in that in any one of said first to third inventions, said grip member has a slider including right and left side plates, an internal slider provided between said side plates of the slider and including right and left side plates, and a hook rotatably supported around a first revolving shaft extending in the right-left direction between said side plates of said internal slider and also rotatably supported around a second revolving shaft extending in the right-left direction between said side plates of said slider, the hook adapted to shift between a gripping mode for gripping said roof between the slider and the hook and a grip-disengaging mode for releasing said roof from the gripped condition by rotating the hook in a positive or inverse direction around said second revolving shaft; said rail is configured to allow said slider to move in the up-down direction between said gripping position and said holding position, said spring is provided between said internal slider and a bottom of said rail and has a main spring for moving said grip member in the up-down direction between said gripping position and said holding position and a secondary spring provided above said main spring and for shifting said hook between said gripping mode and the grip-disengaging mode, and said push-pull cable has one end attached to said internal slider, said roof locking apparatus for a vehicle characterized in that: to retract said roof into said storage space, said push-pull cable is driven by said cable drive mechanism to carry out the pulling operation so that said internal slider is pulled down by the push-pull cable against an elastic force of said secondary spring to rotate said hook in the positive direction around said second revolving shaft and to thereby shift the same from said grip-disengaging mode to said gripping mode, and then after said grip member having gripped said roof in said gripping position, said push-pull cable is driven to move the grip member with said roof gripped thereby against an elastic force of said main spring along said rail from said gripping position to said holding position, where the grip member with said roof gripped thereby is held, while on the other hand, to get the roof retracted in said storage space out of the storage space, said push-pull cable is driven by said cable drive mechanism to carry out the pushing-out operation so that the grip member with said roof gripped thereby is moved by the elastic force of said main spring from said holding position to said gripping position, and then said internal slider is pushed up by the elastic force of the secondary spring to rotate said hook in the inverse direction around said second revolving shaft and to thereby shift the same from said gripping mode to said grip-disengaging mode, allowing said roof to be released from the gripped condition by said grip member in said gripping position.

Consequently, as the grip member grips the roof or releases the gripped condition by the push-pull cable and the secondary spring, simple configuration makes it possible to hold the roof in a storage space and release the holding.

A five invention is characterized in that in said fourth invention, said main spring has a spring constant of higher than that of the secondary spring.

Consequently, as the spring constant of the main spring is set higher than that of the secondary spring, it is possible to prevent the grip member from going below the gripping position against the elastic force of the main spring along the rail, before the grip member grips the roof in the gripping position against the elastic force of the secondary spring.

A sixth invention is characterized in that in any of said first to fifth inventions, said roof locking apparatus further includes a stopper provided on said rail and for restricting positioning of said grip member between said gripping position and said holding position.

Consequently, as the stopper for restricting positioning of said grip member between said gripping position and said holding position, the positioning of said grip member is restricted between the gripping position and the holding position.

Effect of the Invention

According to the present invention, to get a roof retracted in a storage space out of the storage space, a push-pull cable is driven by a cable drive mechanism to carry out pulling operation so that a grip member gripping a front end of the roof is moved by an elastic force of a spring along a rail from a holding position to a gripping position, where then the front end of the roof is released by the grip member in the gripping position. Thus, when the roof retracted in the storage space is gotten out of the storage space, the roof can be prevented from owing. Accordingly, when the roof retracted in the storage space is gotten out of the storage space, the roof can be prevented from oscillating during movement thereof and being damaged.

DESCRIPTION OF REFERENCE NUMERALS

Figure 1:
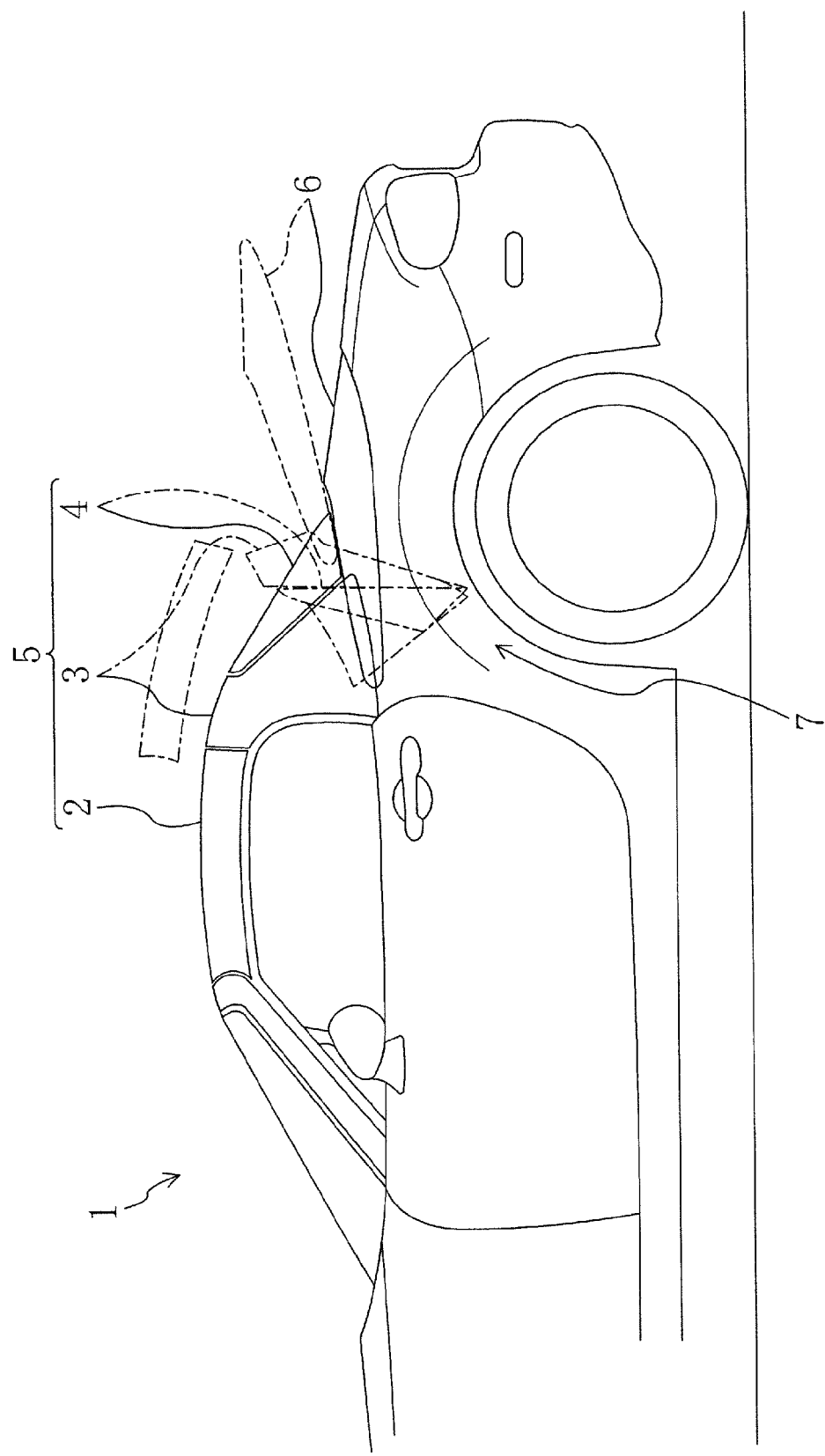
FIG. 1 is a schematic side elevation showing a running vehicle including a retractable roof according to an embodiment of the present invention.

1 Running vehicle
2 Front roof
3 Back roof
4 Rear window
5 Retractable roof
6 Lid
7 Storage space
10 Link mechanism (cable drive mechanism)
14 Drive lever
61 Wire guiding
61a Channel
62 Holder
70 Roof locking apparatus
71 Hook (grip member)
72 Internal slider (grip member)
73 Slider (grip member)
74 Rail
77 Secondary spring
79 Main spring
84 Stopper
90 Push-pull cable

BEST MODE FOR CARRYING OUT THE INVENTION

Embodiments of the present invention will hereinafter be described in detail with reference to the drawings.

Figure 2:
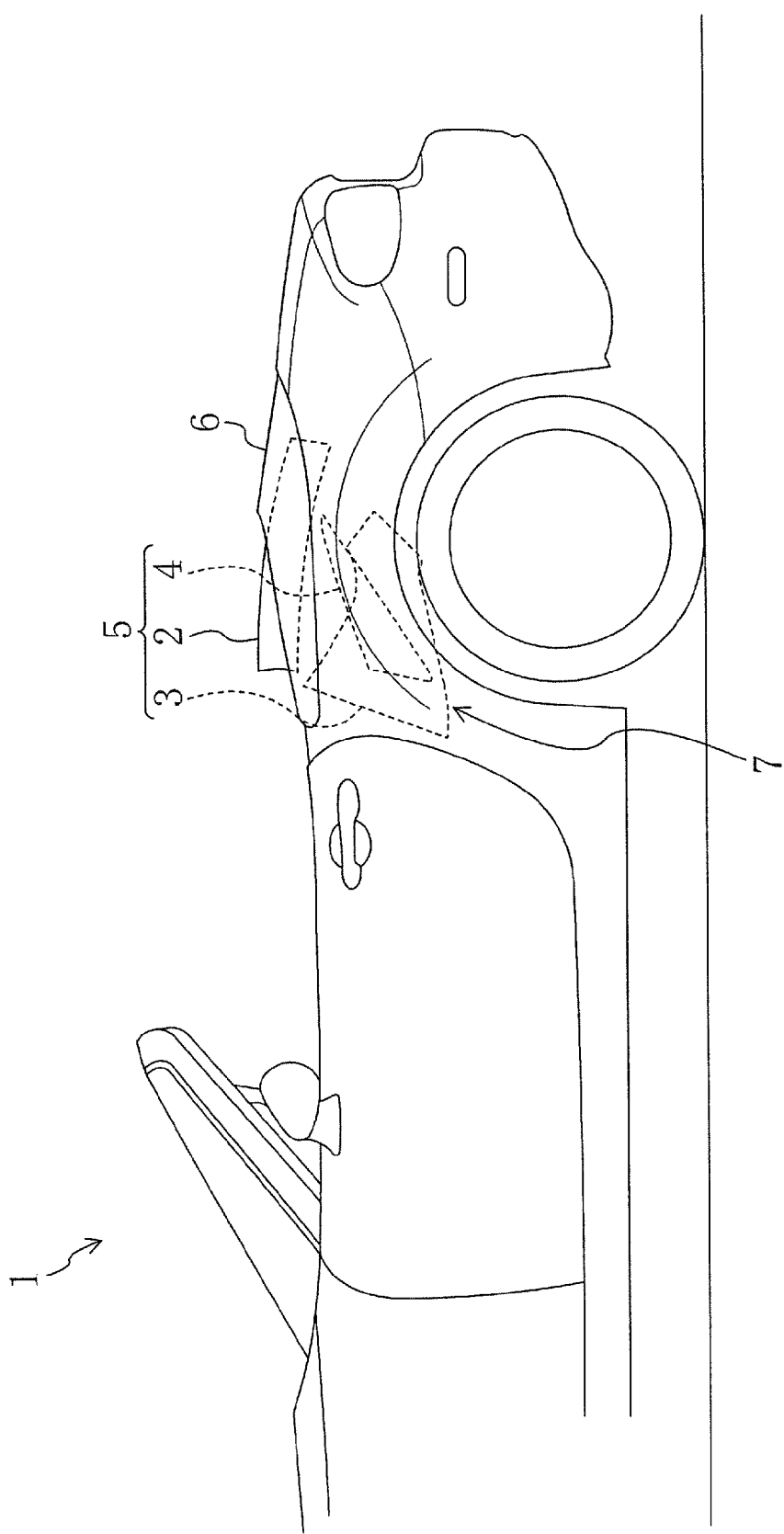
FIG. 2 is a schematic side elevation of a running vehicle including a retractable roof.
Figure 3:
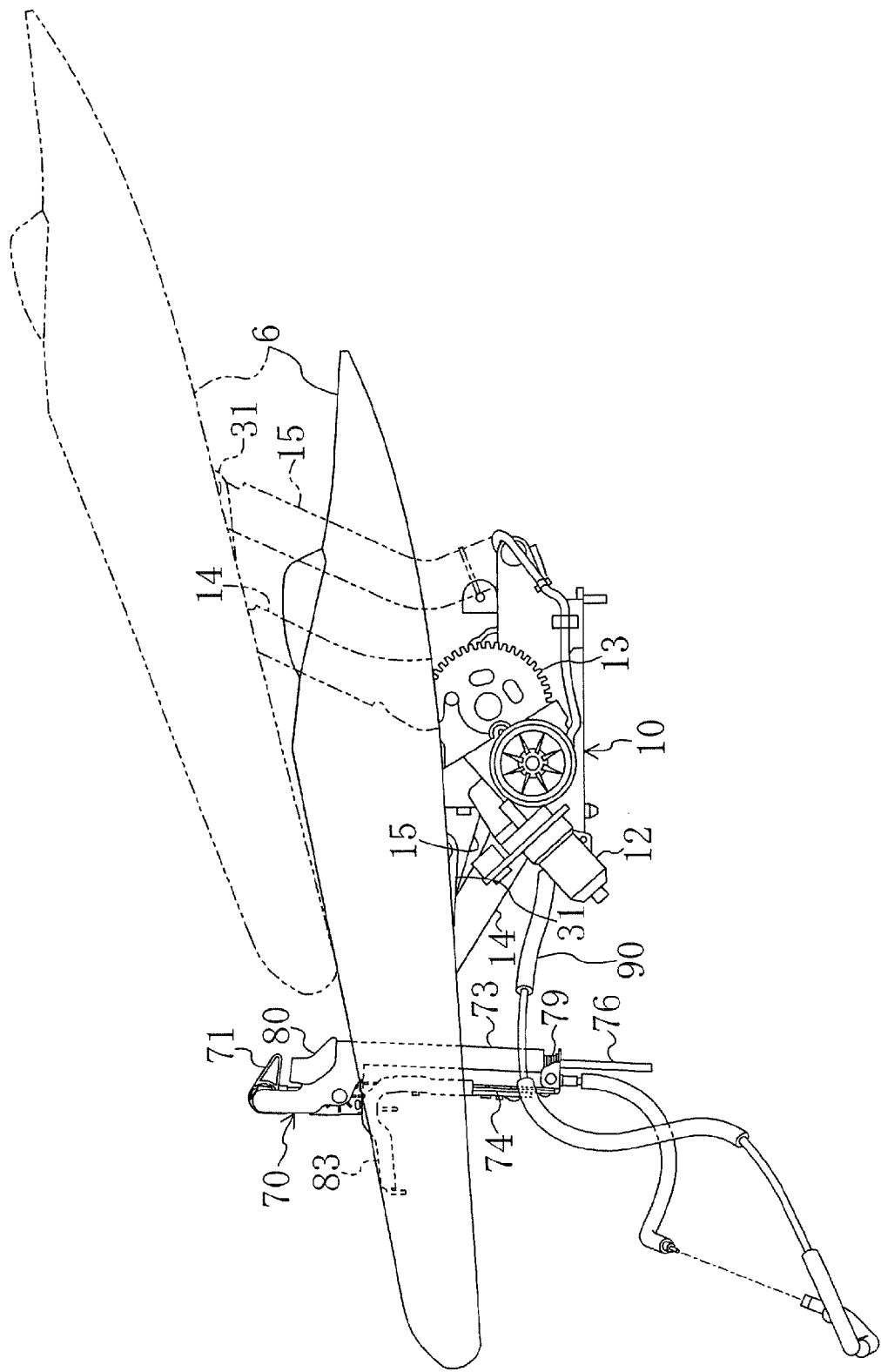
FIG. 3 is a side elevation of a link mechanism and a roof locking apparatus.
Figure 4:
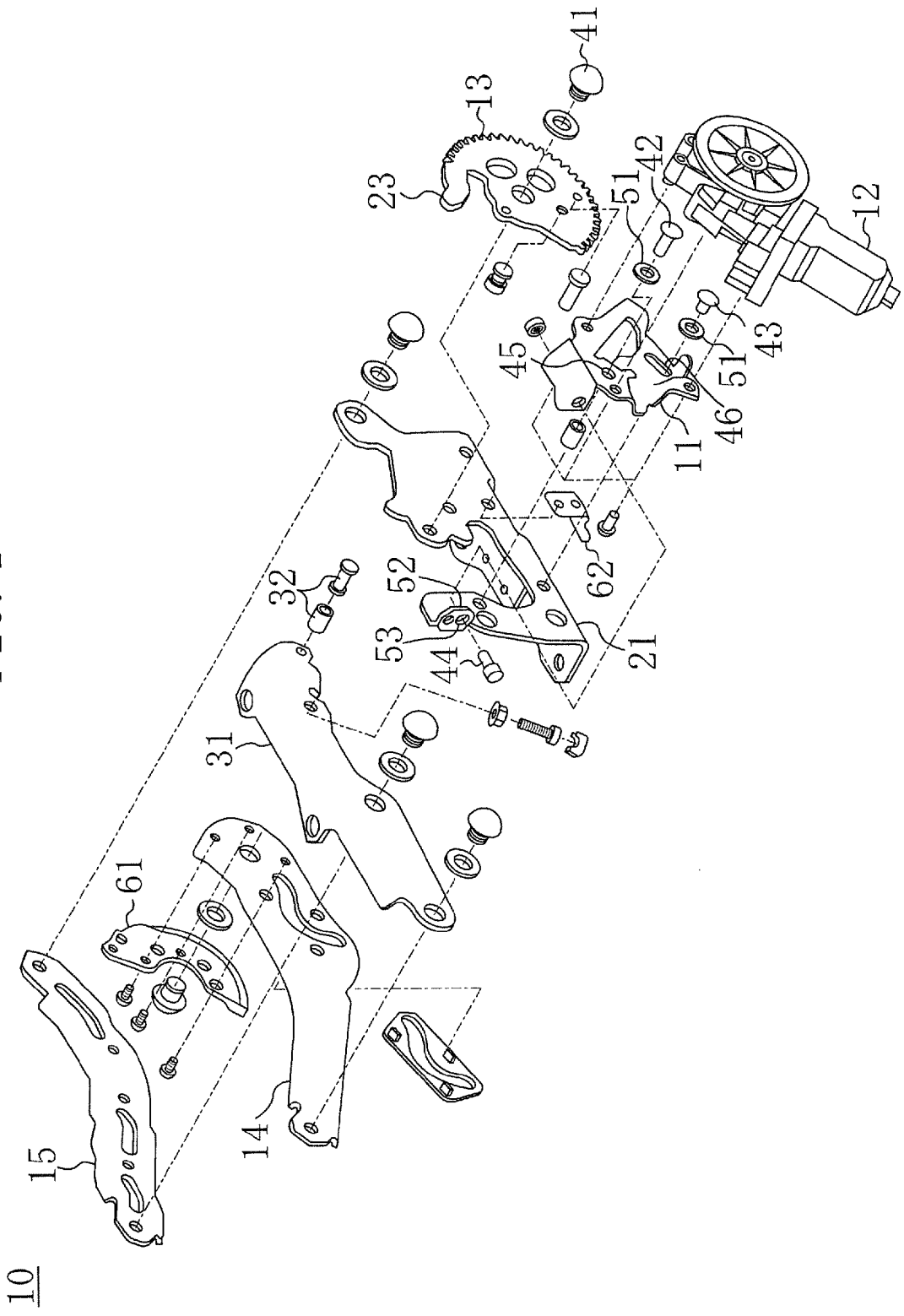
FIG. 4 is an exploded perspective view of a link mechanism.
Figure 5:
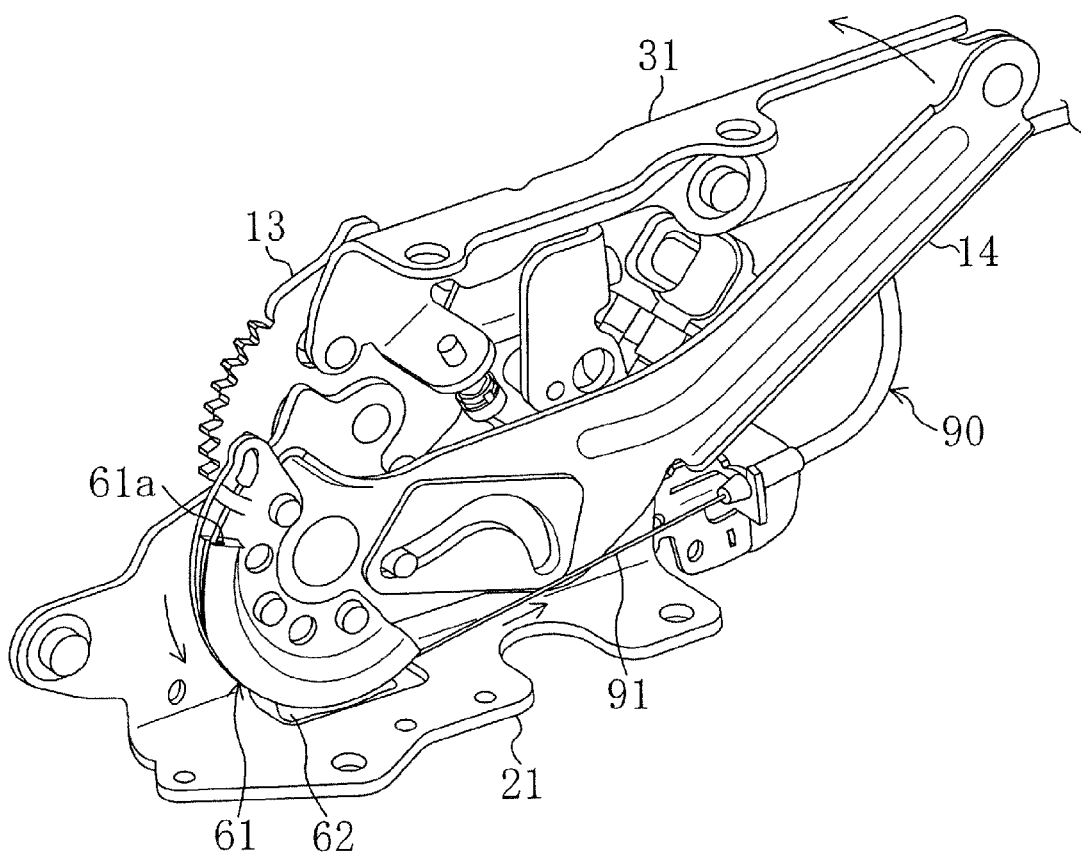
FIG. 5 is a perspective view of a link mechanism with a lid closed.
Figure 6:
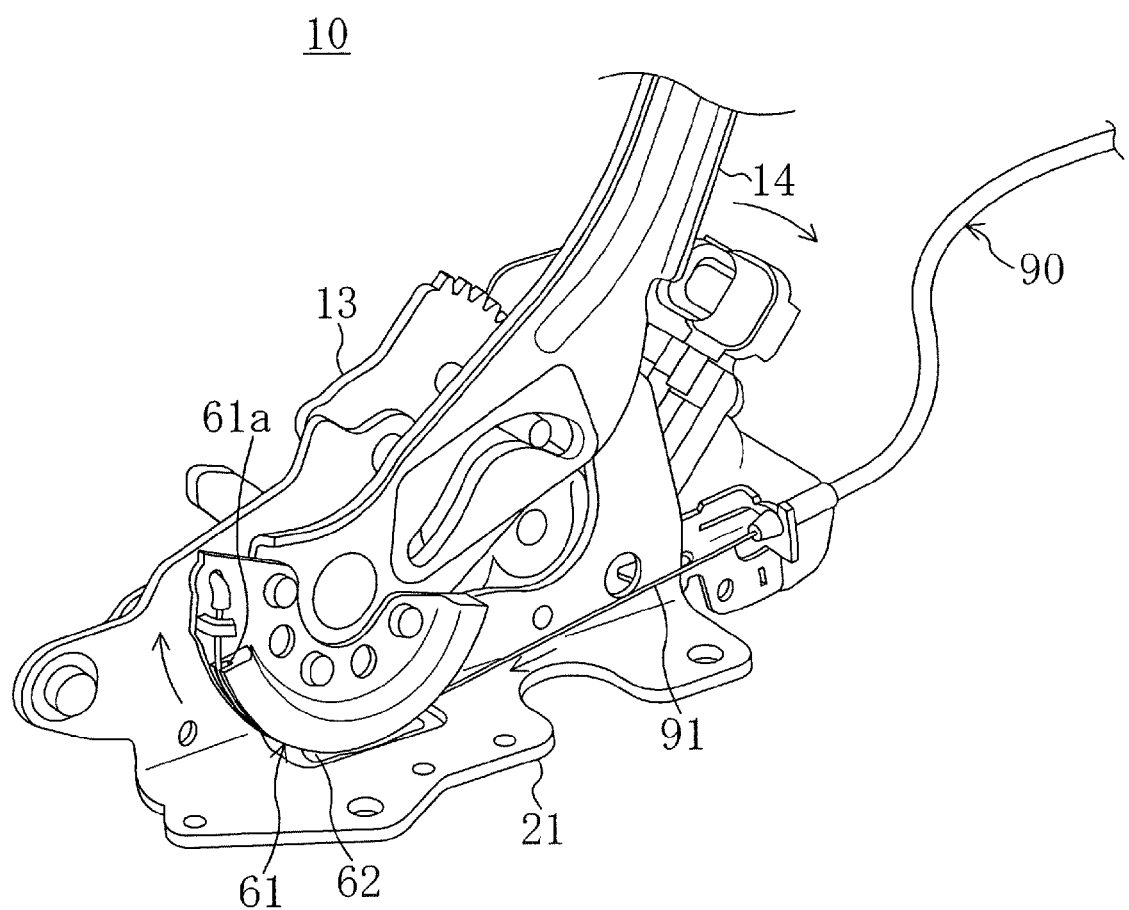
FIG. 6 is a perspective view of a link mechanism with a lid open.
Figure 7:
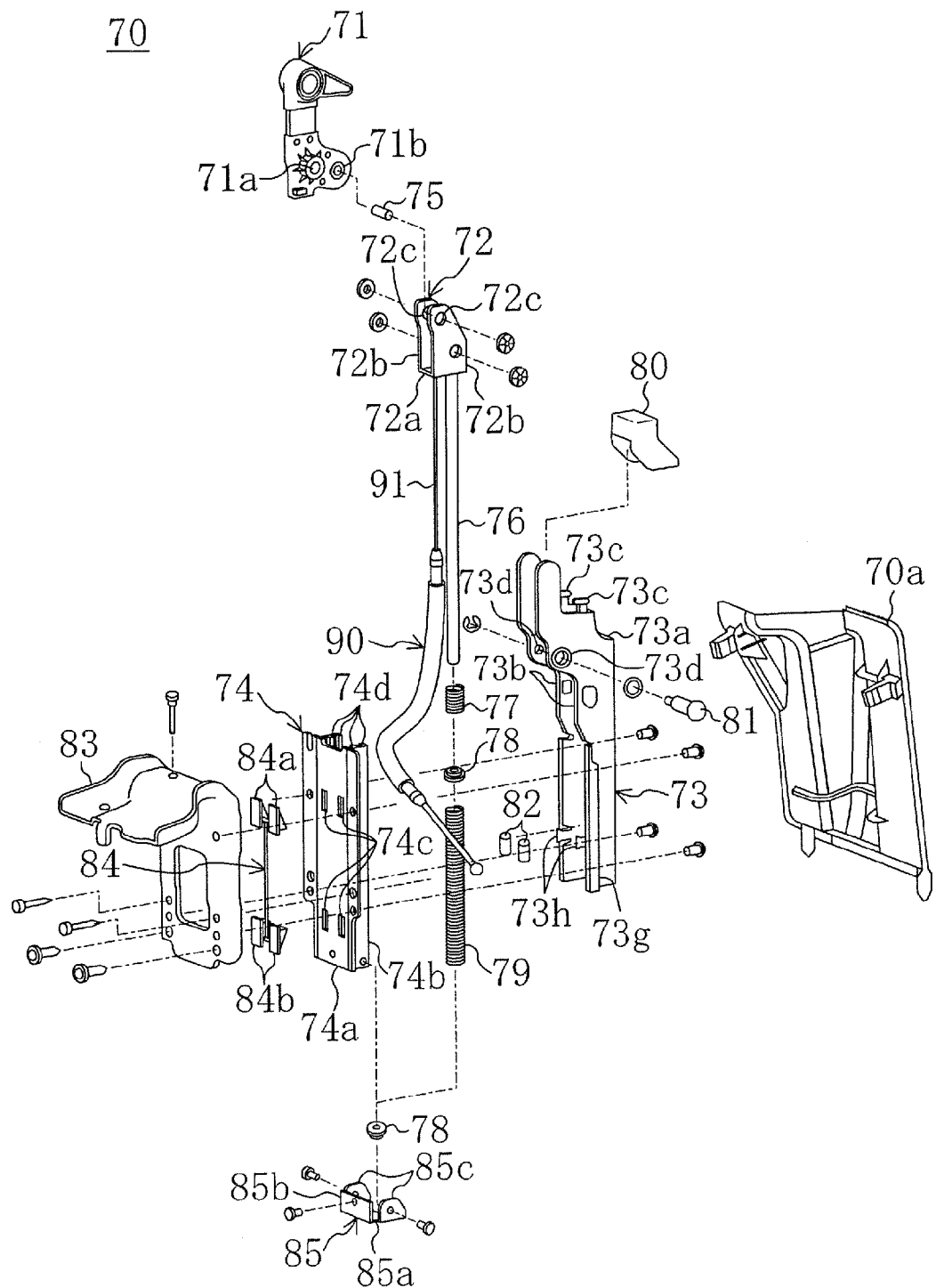
FIG. 7 is an exploded perspective view of a roof locking mechanism.
Figure 8:
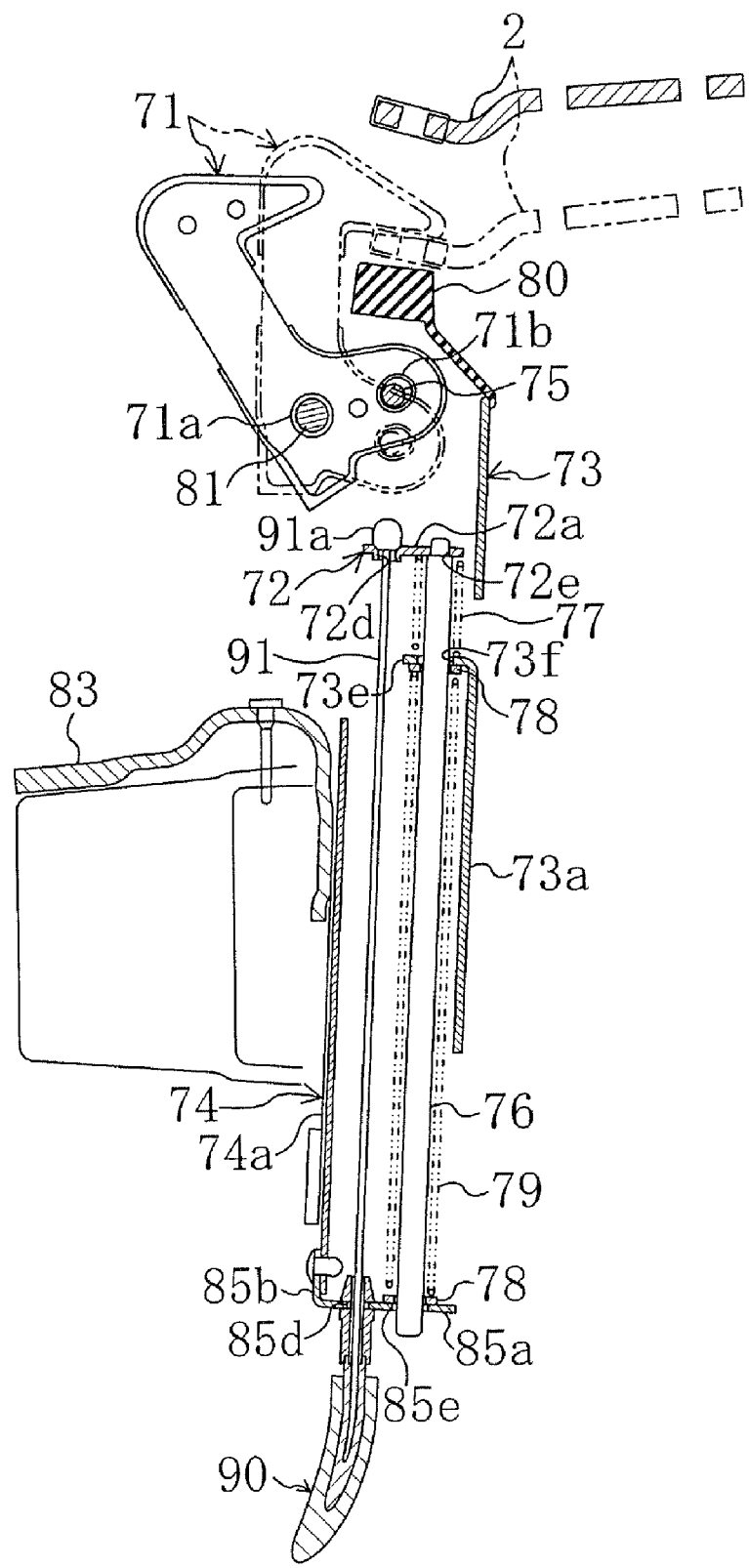
FIG. 8 is a cross sectional view of a roof locking mechanism with a hook in a grip-disengaging mode.
Figure 9:
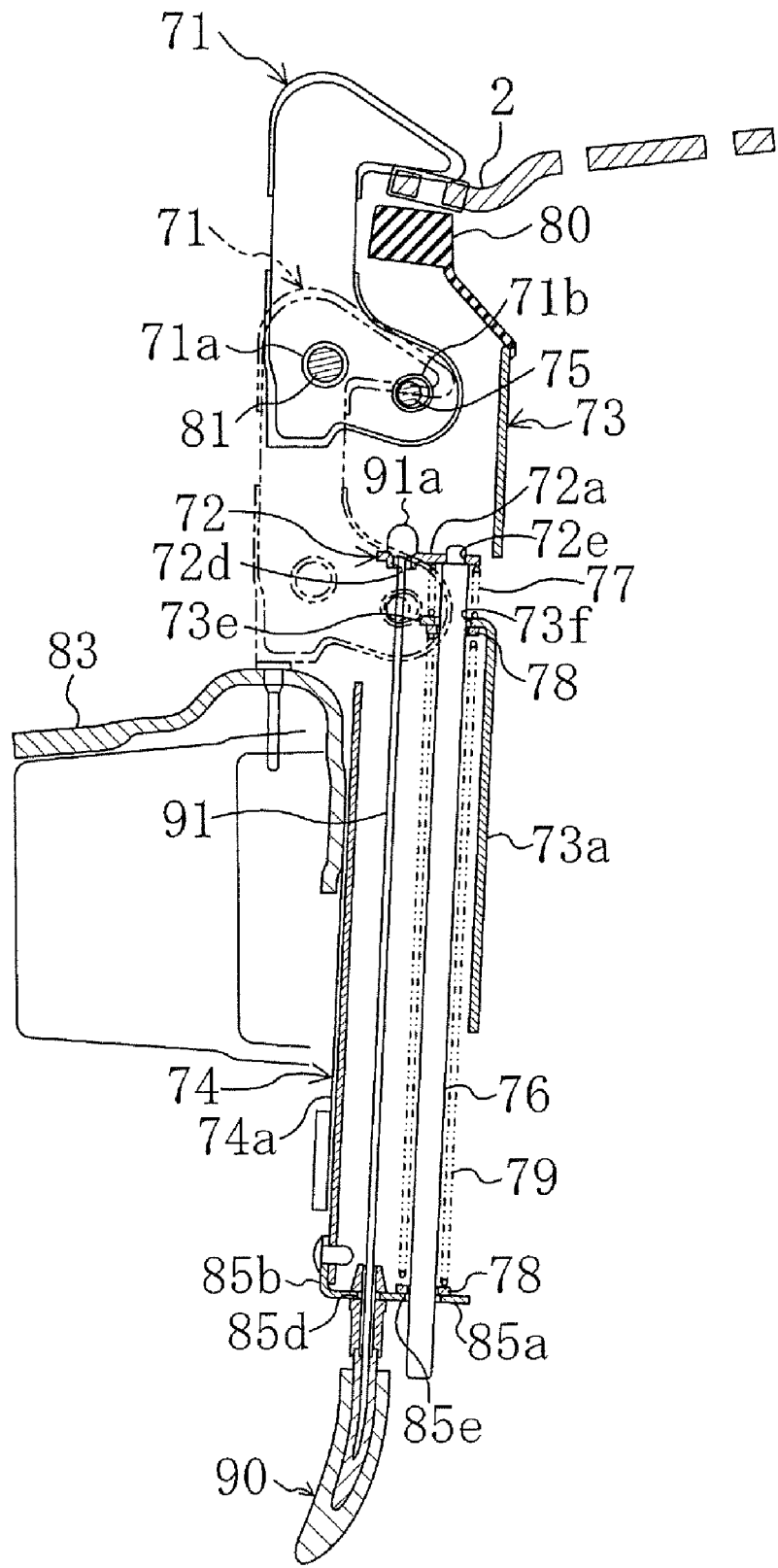
FIG. 9 is a cross sectional view of a roof locking mechanism when a grip member is in a gripping position.
Figure 10:
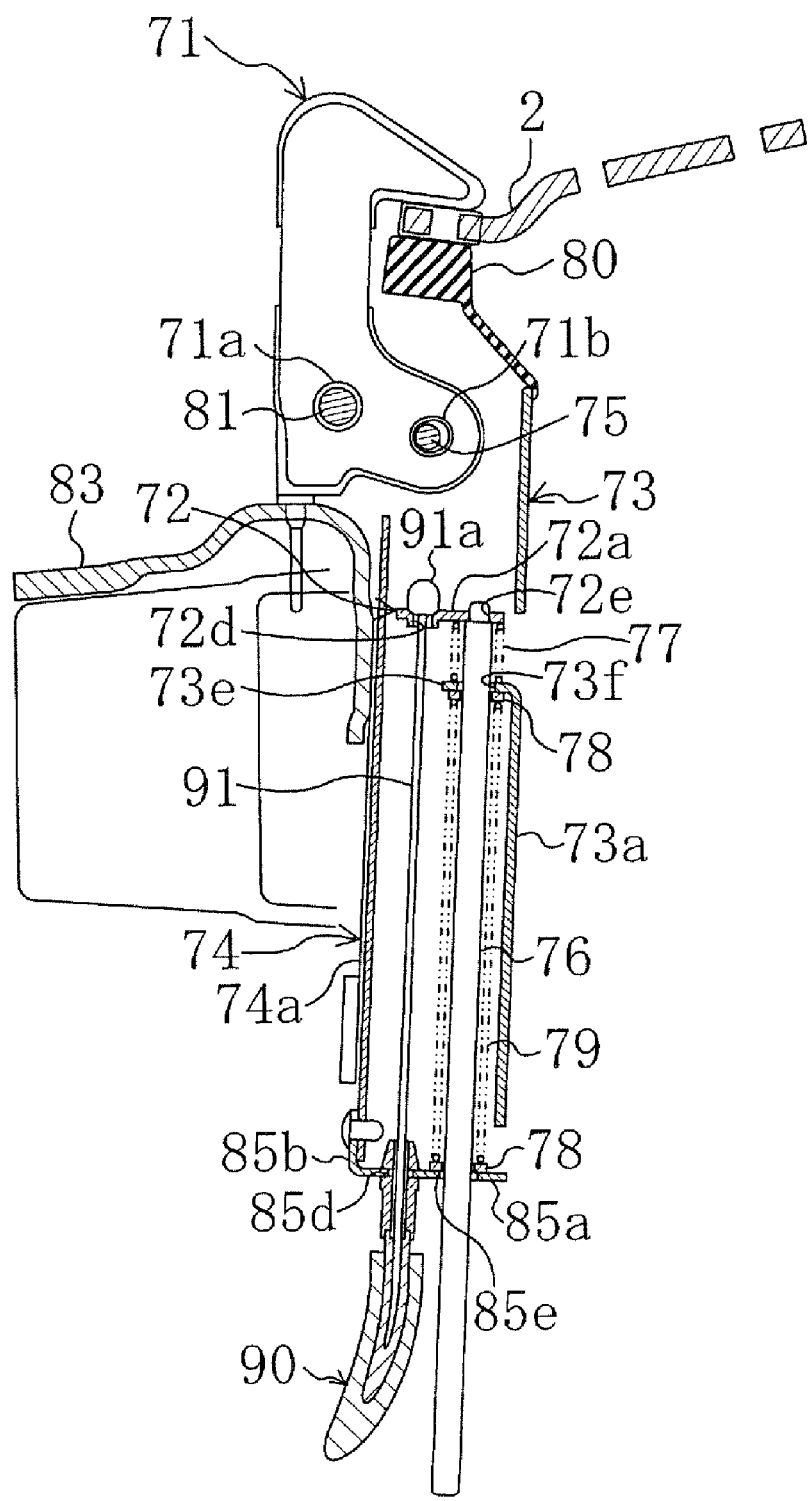
FIG. 10 is a cross sectional view of a roof locking mechanism when a grip member is in a retracted position.

FIG. 1 and FIG. 2 are schematic side elevations showing a running vehicle (passenger vehicle) including a retractable roof 5. FIG. 3 is a side elevation of a link mechanism 10 and a roof locking apparatus 70. FIG. 4 is an exploded perspective view of a link mechanism 10. FIG. 5 is a perspective view of a link mechanism 10 with a lid (tonneau cover) 6 closed when the link mechanism 10 is viewed from a right rear direction. FIG. 6 is a perspective view of a link mechanism 10 with a lid 6 opened when the link mechanism 10 is viewed from a right rear direction. FIG. 7 is an exploded perspective view of a roof locking mechanism. FIG. 8 is a cross sectional view of a roof locking mechanism with a hook in a grip-disengaging mode. FIG. 9 is a cross sectional view of a roof locking mechanism when a grip member is in a gripping position. FIG. 10 is a cross sectional view of a roof locking mechanism when a grip member is in a retracted position.

Configuration of a Retractable Roof

As shown in FIG. 1 and FIG. 2, the retractable roof 5 includes a front roof 2 that constitutes a ceiling of a passenger compartment, and a back roof 3 and a rear window 4 on the back side. In a fully opened state as shown in FIG. 2, the front roof 2, the back roof 3, and the rear window 4 are folded and retracted in a storage space 7, the storage space being located in the vehicle in front of a trunk space at rear end of the vehicle 1. FIG. 1 shows the retractable roof 5 in fully closed state in solid line, and that in semi-opened state in dashed line. Then, when the retractable roof is in fully opened state or fully closed state, the storage space 7 is shielded by a lid 6. The retractable roof 5 is opened and closed by a link mechanism, and the lid 6 is opened and closed by the link mechanism 10. The front roof 2 of the retractable roof 5 in the storage space 7 is held by a roof locking apparatus 70. However, as figures become complicated and not easy to see, the link mechanism for opening and closing the retractable roof 5, the link mechanism 10, and the roof locking apparatus 70 are not shown in FIG. 1 and FIG. 2.

-Configuration of a Link Mechanism-

As shown in FIG. 3 to FIG. 6, the link mechanism 10 (corresponding to a cable drive mechanism) that can shift the lid 6 between an open position (refer to a two-dot chain line in FIG. 3) and a closed position (refer to a solid line in FIG. 3) is a mechanism for opening and closing the lid 6 with a motor 12 as a driving source, the link mechanism having a main bracket 21 as a base, a lid bracket 31 secured to the lid 6, a drive lever 14 both ends of which are pivotally connected to the main bracket 21 and the lid bracket 31 and that actuates the link mechanism 10, and a driven lever 15 both ends of which are pivotally connected to the main bracket 21 and the lid racket 31 and that restricts opening/closing range and opening/closing action of the lid 6. The main bracket 21 is fixed to the base of the storage space 7 to be fixed to the vehicle body. In addition, as the figures become complicated and not easy to see, the driven lever 15 is not shown in FIG. 5 and FIG. 6.

The drive lever 14 is driven by a sector gear 13. The sector gear 13 is rotatably attached by a sector gear mounting bolt 41 to the main bracket 21 as the base and driven by the motor 12 through a pinion (not shown). The motor 12 is secured to a motor bracket 11 that is attached by 2 bolts 42, 43 to the main bracket 21. Of these bolts 42, 43, the bolt 42 is inserted into an opening 45 opened in the motor bracket 11 and the bolt 43 is inserted into a long hole 46 opened in the motor bracket 11. Either of the bolts sandwiches a washer 51 between the motor bracket 11 and the bolt and is threaded into an opening with a female screw opened on the main bracket 21. In the main bracket 21 is provided a bend part 52 that is bent from a plane to which the motor bracket 11 is attached and vertically extends to the plane, the main bracket being secured to the motor bracket 11 by inserting an emergency bolt 44 into a mounting hole 53 opened in the bent part.

When the lid 6 is closed, a hook unit 23 provided in the sector gear 13 locks the lid 6 so that it does not open, by engaging with a hook engaging pin 32 provided on a lid bracket 31 that is fixed to the lid 6.

As shown in FIG. 4 to FIG. 6, a wire guiding 61 is fixed to the right side of the lower end of the drive lever 14. The wire guiding 61 is in the form of a plate and formed almost like a semicircle when viewed from the side of the vehicle. A central shaft of the wire guiding 61 matches a revolving shaft of the lower end of the drive lever 14. In an outer periphery of the right side of the wire guiding 61 is formed a channel 61a that opens toward a radially outer side. An inner wire 91 of a push-pull cable 90, to be described later, is hung around the channel 61a with a back end of the inner wire 91 fixed to the wire guiding 61.

A holder 62 is welded and fixed to the main bracket 21 so as to cover the channel 61a of the wire guiding 61. The holder 62 is intended to prevent the inner wire 91 of the push-pull cable 90 from slipping from the channel 61a of the wire guiding 61.

-Configuration of a Roof Locking Apparatus-

As shown in FIG. 3 and FIG. 7 to FIG. 10, the roof locking apparatus 70 is intended to hold a front end of the front roof 2 in the middle portion with respect to a vehicle width direction within the storage space 7. The roof locking apparatus 70 is adapted to work with the link mechanism 10. The roof locking apparatus 70 includes a hook 71, an internal slider 72, a slider 73, a rail 74, and the push-pull cable 90. The hook 71, the internal slider 72 and the slider 73 constitute a grip member that grips the front end of the front roof 2 in the middle portion with respect to the vehicle width direction as it is being stored into the storage space 7. The grip member and the rail 74 constitute a roof locking mechanism for holding the front end of the front roof 2 in the middle portion with respect to the vehicle width direction within the storage space 7. The roof locking mechanism, covered by a trim 70a from the rear side of the vehicle, is fixed to a region opposed to the front end of the front roof 2 in the middle portion with respect to the vehicle width direction within the storage space 7, in the vehicle body. The rail 74, the push-pull cable 90, and said link mechanism 10 constitute a moving mechanism that moves the grip member in the up-down direction between a gripping position where the grip member grips the front roof 2 (refer to a two-dot chain line in FIG. 8 and a solid line in FIG. 9) and a retracted position (corresponding to a holding position. Refer to a two-dot chain line in FIG. 9 and see FIG. 10) provided below the gripping position by a predetermined distance (50 mm, for example) away therefrom where the grip member with the front roof 2 gripped thereby is held. In addition, the front-back direction of the roof locking apparatus 70 matches the front-back direction of the vehicle and its right-left direction matches the vehicle width direction. In FIG. 3, as the figure becomes complicated and not easy to see, diagrammatic representation of the retractable roof 5 is omitted.

Said hook 71 is adapted to be able to shift between a gripping mode (refer to the two-dot chain line in FIG. 8 and the solid line in FIG. 9) for gripping the front roof 2 between a cushion rubber 80 of the slider 73 and the hook and a grip-disengaging mode (refer to a solid line in FIG. 8) for releasing the front roof 2, by rotating the hook in a positive or inverse direction around a central shaft of a shaft 81 to be described later. In the grip-disengaging mode, the hook 71 is tilted to the front of the vehicle. The hook 71 is formed almost like a letter C when viewed from the side of the vehicle. On the front and back sides of the lower part of the hook 71 are formed a circular shaft insertion hole 71a and a pin insertion hole 71b shaped like a long hole, respectively, so as to extend to the vehicle width direction.

Said internal slider 72 is provided between upper parts of the right and left side plates 73b, 73b of the slider 73. The internal slider 72 has a bottom plate 72a and right and left side plates 72b, 72b, respectively extending upward from the right and left edges of the bottom plate 72a. In the upper ends of respective side plates 72b are formed circular pin insertion holes 72c so that they are opposed to each other. Between the side plates 72b and 72b is arranged the hook 71 so that its pin insertion hole 71b corresponds to the pin insertion hole 72c of each side plate 72b. A pin 75 extending to the vehicle width direction (corresponding to the right-left direction) is inserted into and supported by the pin insertion hole 72c of each side plate 72b and the pin insertion hole 71b of the hook 71.

As such, the hook 71 is rotatably supported around the central shaft of the pin 75 (corresponding to a first revolving shaft) between the side plates 72b and 72b of the internal slider 72. On the front and back sides of the bottom plate 72a are formed a circular wire clamping hole 72d and a circular rod insertion hole 72e, respectively. The upper end of the inner wire 91 of the push-pull cable 90 is clamped to a wire camp hole 72d. To be specific, by attaching a clamp 91a to an upper end of the inner wire 91 with the upper end inserted through the wire clamp hole 72d, the upper end of the inner wire 91 is clamped to the wire clamp hole 72d. An upper end of a rod 76 is inserted into and fixed to a rod insertion hole 72e.

The rod 76 is columnar and extends in the up-down direction. A secondary spring 77, a bushing 78, a main spring 79 and a bushing 78 are fitted onto the rod 76 in this order from the top. The secondary spring 77 is intended to shift the hook between the gripping mode and the grip-disengaging mode. The main spring 79 is intended to move the grip member in the up-down direction between the gripping position and the retracted position. The main spring 79 is made longer than the secondary spring 77. Elastic property of the main spring 79 differs from that of the secondary spring 77. To be specific, a spring constant of the main spring 79 is set higher than that of the secondary spring 77 so that the grip member is not moved below the gripping position against an elastic force of the main spring 79 along the rail 74 before the grip member grips the front roof 2 against an elastic force of the secondary spring 77 in the gripping position.

Said slider 73 formed like a letter C on the cross section, and has a bottom plate 73a and right and left side plates 73b, 73b, respectively, extending to the front of the vehicle from right and left edges of the bottom plate 73a. Length of each side plate 73b in the front-back direction of the vehicle increases as it goes upward. On an upper end of each side plate 73 is arranged a protrusion 73c that protrudes upward. A cushion rubber 80 is fixed to protrusions 73c, 73c with the protrusions 73c respectively inserted into the 2 insertion holes (not shown) of the cushion rubber 80. The cushion rubber 80 is intended to restrict behavior of a top lock cover (not shown) of the front roof 2 to prevent the front roof 2 from bowing. The cushion rubber 80 covers the slider 73 from the upper side thereof. A rear face of the cushion rubber 80 is formed so that it tilts to the rear of the vehicle as it goes down.

On the front side of the upper part of each side plate 73b of the slider 73 is formed circular shaft insertion holes 73d so as to be opposed to each other. Between the side plates 73b and 73b is arranged the internal slider 72 to which the hook 71 is rotatably attached so that the shaft insertion hole 71a of the hook 71 corresponds to the shaft insertion hole 73d of each side plate 73b. A shaft 81 extending to the vehicle width direction (corresponding to the right-left direction) is inserted into and supported by the shaft insertion hole 73d of each side plate 73b and the shaft insertion hole 71a of the hook 71. As such, the hook 71 is rotatably supported around the central shaft (corresponding to a second revolving shaft) of the shaft 81 between the side plates 73b and 73b of the slider 73.

On an inner surface in the upper part of the slider 73 is arranged an intermediate plate 73e so as to extend to the horizontal direction. A circular rod insertion hole 73f is formed on the intermediate plate 73e. The rod 76 is inserted into the rod insertion hole 73f so as to be movable in the up-down direction. Then, the secondary spring 77 is arranged between the upper surface of the intermediate plate 73e and the lower surface of the bottom plate 72a of the internal slider 72. The bushing 78, the main spring 79, and the bushing 78 are arranged in this order from top, between the lower surface of the intermediate plate 73e and upper surface of a bottom plate 85a of a bottom member 85.

On the front side of the lower part of each side plate 73b of the slider 73 is arranged a protruding bar 73g that protrudes outward in the vehicle width direction. On the front edge of the lower part of each side plate 73b is arranged a protrusion 73h that protrudes to the front of the vehicle. A cushion stopper 82 is fixed to each protrusion 73h so as to cover the protrusion 73h. The cushion stopper 82 is intended to restrict positioning of the slider 73 of the grip member between the gripping position and the retracted position.

Said rail 74 is adapted to allow the slider 73 of the grip member to move in the up-down direction between the gripping position and the retracted position. The rail 74 is fixedly screwed to a hook bracket 83. The hook bracket 83 is fixed to a region opposed to the front end of the front roof 2 in the middle part with respect to the vehicle width direction within the storage space 7 and formed like letter L when viewed from the side of the vehicle. In other words, the rail 74 is attached to the region opposed to the front end of the front roof 2 in the middle part with respect to the vehicle width direction via the hook bracket 83 within the storage space 7, in the vehicle body. The rail 74 is formed almost like letter C on the cross section, and has a bottom plate 74a and right and left side plates 74b, 74b respectively extending to the rear of the vehicle from right and left edges of the bottom plate 74a. In the upper part and the lower part of the bottom plate 74a are 2 almost rectangular stopper insertion holes 74c, 74c spaced to each other by a predetermined spacing with respect to the vehicle width direction. A stopper 84 is inserted and fixed to the stopper insertion hole 74c.

The stopper 84 is intended to restrict positioning of the slider 73 of the grip member between the gripping position and the retracted position. The stopper 84 has 2 upper stoppers 84a, 84a and 2 lower stoppers 84b, 84b. Respective upper and lower stoppers 84a, 84b are formed almost like a triangle when viewed from the side of the vehicle. The rear face of each upper stopper 84a is formed to tilt to the rear of the vehicle as it goes down and the rear face of each lower stopper 84b is formed to tilt to the rear of the vehicle as it goes up. In addition, if a position on the lower surface of each upper stopper 84a or on the upper surface of each lower stopper 84b is changed, the gripping position or the retracted position is changed. In other words, if a distance between the lower surface of each upper stopper 84a and the upper surface of each lower stopper 84b is changed, a predetermined distance between the gripping position and the retracted position is changed.

On an inner surface of each side plate 74b of the rail 74 is arranged a pair of rail plates 74d, 74d that protrude inward in the vehicle width direction and are spaced to each other at regular interval. Each protruding bar 73g of the slider 73 is fitted movably in the up-down direction between the side plates 74d and 74d.

To the lower end of the rail 74 is fixed a bottom member 85 (corresponding to the bottom of the rail 74) so that it covers the lower end of the rail 74 from its underside. The bottom member 85 has a bottom plate 85a and a front side plate 85b and the right and left side plates 85c, 85c extending upward from the front edge of the bottom plate 85a and the right and left edges, respectively. On the front and back sides of the bottom plate 85a are formed a circular wire insertion hole 85d and a circular rod insertion hole 85e, respectively. The inner wire 91 of the push-pull cable 90 is inserted movably in the up-down direction into the wire insertion hole 85d. The rod 76 is inserted movably in the up-down direction into the rod insertion hole 85e. The front side plate 85b and the right and left side plates 85c, 85c are riveted to the bottom plate 74a and the right and left side plates 74b, 74b, respectively.

Said push-pull cable 90 is intended to transmit a driving force (operating force) to a roof locking mechanism, thereby causing a holding operation of the front roof 2 in the storage space 7 and a releasing operation thereof. As described above, the push-pull cable 90 has one end attached to the internal slider 72 of the grip member and the other end attached to the wire guiding 61 of the link mechanism 10.

-Operation of a Roof Locking Apparatus-

Operation of the roof locking apparatus 70 will be hereinafter described in detail with reference to FIG. 5, FIG. 6, and FIG. 8 to FIG. 10.

First, operation of the roof locking apparatus 70 when the retractable roof 5 is retracted into the storage space 7 will be hereinafter described. In the following description, operation of the roof locking apparatus 70 after the retractable roof 5 has changed from fully closed state to semi-open state, that is, the operation of the roof locking apparatus 70 after the lid 6 changes from closed state to open state is described (refer to FIG. 1). Now when the lid 6 is in open state, the link mechanism 10 is in the condition as shown in FIG. 6, and a roof locking mechanism is in the condition as shown in a solid line in FIG. 8.

When the link mechanism 10 starts a position changing operation from the open position to the closed position of the lid 6, the drive lever 14 of the link mechanism 10 rotates clockwise in a positive direction centering around a revolving shaft of a lower end thereof, as shown in FIG. 6. Accordingly, the wire guiding 61 of the link mechanism 10 also rotates clockwise in a positive direction centering around the central axis, as shown in FIG. 6. Consequently, the inner wire 91 of the push-pull cable 90 is pulled to the side of the wire guiding 61 as it is wound up by the wire guiding 61 of the link mechanism 10. Accordingly, the internal slider 72 is pulled down by the inner wire 91 and moved down against an elastic force of the secondary spring 77. Then, the rear side of the lower part of the hook 71 is pulled down by the internal slider 72 and the hook 71 rotates clockwise in the positive direction centering around the central shaft of the shaft 81, as shown in FIG. 8. Accordingly, the hook 71 is shifted from the grip-disengaging mode to the gripping mode and the grip member grips the front roof 2 in the gripping position. As described above, the holding operation of the front roof 2 by the roof locking mechanism in the storage space 7 is started, almost simultaneously with changing of the lid 6 from the closed position to the open position by the link mechanism 10 is started (same period).

Then, the grip member with the front roof 2 gripped thereby is pulled down by the inner wire 91 against an elastic force of the main spring 79 and slidingly moved down along the rail 74. When the grip member with the front roof 2 gripped thereby slidingly moves to the retracted position, the cushion stopper 82 of the slider 73 of the grip member abuts on the upper surface of the lower stopper 84b of the rail 74. Accordingly, the grip member with the front roof 2 gripped thereby is stopped by the stopper 84 and held in the retracted position. Then, almost simultaneously (same period) with end of the position changing operation of the lid 6 by the link mechanism 10 to the closed position, the holding operation of the front roof 2 by the roof locking mechanism in the retracted space 7 ends. Now, if the lid 6 is in closed state, the link mechanism 10 is in the state as shown in FIG. 5 and the roof locking apparatus is in the state as shown in FIG. 10.

Operation of the roof locking apparatus 70 when the retractable roof 5 retracted in the storage space 7 is gotten out of the storage space 7 will be hereinafter described.

When the link mechanism 10 starts a position changing operation of the lid 6 from a closed position to an open position, the drive lever 14 rotates anticlockwise, as shown in FIG. 5, in an inverse direction centering around a revolving shaft of the lower end. With this, the wire guiding 61 of the link mechanism 10 also rotates anticlockwise, as shown in FIG. 5, in the inverse direction centering around the central shaft. Consequently, the inner wire 91 of the push-pull cable 90 is pushed out, or loosened, to the opposite side of the wire guiding 61 by the wire guiding 61 of the link mechanism 10. Then, the grip member with the front roof 2 gripped thereby is pushed up by an elastic force of the main spring 79 and slidingly moved upward along the rail 74. As described above, almost simultaneously (same period) with starting of the position changing operation of the lid 6 to the open position by the link mechanism 10, the operation of releasing holding of the front roof 2 in the storage position 7 by the roof locking apparatus 10 is started.

Then, when the grip member with the front roof 2 gripped thereby slidingly moves to the gripping position, the cushion stopper 82 of the slider 73 of the grip member abuts on the lower surface of the upper stopper 84a of the rail 74. Consequently, the slider 73 of the grip member with the front roof 2 gripped thereby is stopped by the stopper 84 and held in the gripping position.

Then, the internal slider 72 is pushed up by an elastic force of the secondary spring 77 and moved upward. Then, the rear side of the lower part of the hook 71 is pushed up by the internal slider 72, and the hook 71 rotates anticlockwise, as shown in FIG. 8, in the inverse direction centering around the central shaft of the shaft 81. Consequently, the hook 71 is changed from the gripping mode to the grip-disengaging mode and the front roof 2 is released from the gripped condition by the grip member in the gripping position. Then, almost simultaneously (same period) with end of the position changing operation of the lid 6 to the open position by the link mechanism 10, the operation of releasing holding of the front roof 2 in the storage space 7 by the roof locking mechanism ends.

-Effect-

With the above, according to the embodiment, to get out a retractable roof 5 retracted in a storage space 7, a link mechanism 10 is driven to carry out a pushing-out operation of a push-pull cable 90 so that a grip member with a front end of a front roof 2 gripped thereby is moved by an elastic force of a main spring 79 along a rail 74 from a retracted position to a gripping position provided in a position above the retracted position by only a predetermined distance away therefrom with respect to the retracted position, and then in the gripping position, gripping of the front end of the front roof 2 by the grip member in the gripping position is released. In other words, before the gripped condition of the front end of the front roof 2 by the grip member is released, the front end of the front roof 2 is raised. Thus, to get the retractable roof 5 retracted in the storage space 7 out of the storage space 7, the front roof 2 of the retractable roof 5 can be prevented from bowing. Thus, to get the retractable roof 5 retracted in the storage space 7 out of the storage space 7, the front roof 2 can be prevented from oscillating in movement thereof and being damaged.

In addition, as the rail 74 is provided in a region opposed to the front end of the front roof 2 in the middle portion with respect to the vehicle width direction within the storage space 7, the grip member can reliably hold the front end of the front roof 2 in the middle portion with respect to the vehicle width direction within the storage space 7.

In addition, as the grip member grips the front roof 2 by the push-pull cable 90 and the secondary spring 77 or released the gripped condition, a simple configuration enables gripping of the front roof 2 by the grip member and releasing of the gripped condition.

In addition, as the spring constant of the main spring 79 is set higher than that of the secondary spring 77, the grip member can be prevented from moving below the gripping position against an elastic force of the main spring 79 along the rail 74, before the grip member grips the front roof 2 in the gripping position against an elastic force of the secondary spring 77.

As the stopper 84 for restricting positioning of the grip member between the gripping position and retracted position is provided on the rail 74, positioning of the grip member between the griping position and the retracted position can be restricted.

Other Embodiments

Although the hook 71, internal slider 72, and slider 73 constitute the grip member in the above embodiment, the grip member may be anything as far as the front end of the front roof 2 in the middle portion of the vehicle width direction can be griped as it is being retracted into the storage space 7.

In addition, in the above embodiment, although the grip member grips the front roof 2 by the link mechanism 10, the secondary spring 77, and the push-pull cable 90 or releases the gripped condition, the grip member may grip the front roof 2 or release the gripped condition by any means other than these means.

In addition, in the above embodiment, although the link mechanism 10 constitutes the cable drive mechanism, the cable drive mechanism may be anything, as far as the other end of the push-pull cable 90 is attached thereto and it can be driven to carry out the pulling and pushing-out operations of the push-pull cable 90.

In addition, in the above embodiment, although the front end of the front roof 2 in the middle portion with respect to the vehicle width direction is held within the storage space 7, the front end of any roof other than the front roof 2 in the middle portion with respect to the vehicle width direction may be held.

In addition, in the above embodiment, although the rail 74 is provided in a region opposed to the front end of the front roof 2 in the middle portion with respect to the vehicle width direction within the storage space 7, in the vehicle body, any part other than this may be provided as far as the front end of the front roof 2 in the middle portion with respect to the vehicle width direction within the storage space 7 can be held.

In addition, in the above embodiment, although the main spring 79 and the secondary spring 77 constitute the spring, only one spring may be provided between the internal slider 72 and a bottom of the rail 74. In this case, to retract the retractable roof 5 in the storage space 7, the link mechanism 10 carries out the pulling operation of the push-pull cable 90 so that the internal slider 72 is pulled down against an elastic force of the spring by the push-pull cable 90 to rotate the hook 71 in the positive direction around the central shaft of the shaft 81 and to thereby shift the same from the grip-disengaged mode to the gripping mode, and then after gripping the front roof 2 with the grip member in the gripping position, the grip member with the front roof 2 gripped thereby is moved against an elastic force of the spring by the push-pull cable along the rail 74 from the gripping position to the retracted position, where the grip member with the front roof 2 gripped thereby is held. On the one hand, to get the retractable roof 5 retracted in the storage space 7 out of the storage space, the link mechanism 10 is driven to carry out the pushing-out operation of the push-pull cable 90 so that the grip member with the front roof 2 gripped thereby is moved by an elastic force of the spring along rail 74 from the retracted position to the gripping position, and then the internal slider 72 is pushed up by the elastic force of the spring, the gripping mode is changed to the grip-disengaging mode by rotating the hook 71 in the inverse direction around the central shaft of the shaft 81, and front roof 2 is released from the gripped condition by the grip member in the gripping position.

In addition, in the above embodiment, although the spring constant of the main spring 79 is set higher than that of the secondary spring 77, the case is not limited to this, and a same spring constant may be set to both. However, to prevent the grip member from moving below the gripping position against the elastic force of the main spring 79 before the grip member grips the front roof 2 against the elastic force of the secondary spring 77 in the gripping position, it is desirable to set the spring constant of the main spring 79 higher than that of the secondary spring 77.

In the above embodiment, although the upper stoppers 84*a* and the lower stoppers 84*b* constitute the stopper 84, the stopper may be anything as far as it can restrict positioning of the grip member between the gripping position and the retracted position.

The present invention is not limited to the embodiments and may be carried out in other various forms without departing from the sprit or major characteristics.

As such, the above embodiments are simply illustrative in every points, and should no be interpreted in a limited way. The scope of the present invention is illustrated by the Claims, and by no means bound by the text of the application. In addition, variations or modifications belonging to equal scope of the Claims are all within the scope of the present invention.

INDUSTRIAL APPLICABILITY

As described hereinbefore, a roof locking apparatus for a vehicle according to the present invention can be applied to such intended use as preventing a roof from bowing when the roof retracted in the storage space is gotten out from the storage space.

The invention claimed is:

1. A roof locking apparatus for a vehicle installed in a vehicle body for holding a retractable roof in a storage space, said roof locking apparatus for a vehicle comprising:
 a grip member for gripping a front end of said roof in a middle portion with respect to a vehicle width direction during said roof being retracted into said storage space;
 a rail disposed in said vehicle body and adapted to allow said grip member to move in the up-down direction between a gripping position where said grip member grips said roof and a holding position provided at a below location relative to said gripping position by a predetermined distance away therefrom where said grip member with said roof gripped thereby is held;
 a spring disposed between said grip member and a bottom of said rail so as to extend in the up-down direction;
 a push-pull cable whose one end is attached to said grip member; and
 a cable drive mechanism to which is attached the other end of said push-pull cable for carrying out a pulling and a pushing-out operations of said push-pull cable, said roof locking apparatus characterized in that:
 to retract said roof into said storage space, after said grip member having gripped said roof in said gripping position, said push-pull cable is driven by said cable drive mechanism to carry out the pulling operation so that said grip member with said roof gripped thereby is moved by said push-pull cable against an elastic force of said spring along said rail from said gripping position to said holding position, where said grip member with said roof gripped thereby is held, while on the other hand to get said roof retracted in said storage space out of said storage space, said push-pull cable is driven by said cable drive mechanism to carry out the pushing-out operation so that said grip member with said roof gripped thereby is moved by the elastic force of said spring along said rail from said holding position to said gripping position, where said roof is released from the gripped condition by said grip member.

2. The roof locking apparatus for a vehicle according to claim 1, characterized in that:

said roof has a front roof, a rear roof and a rear window, and said grip member is configured to hold a front end of said front roof in a middle portion with respect to the vehicle width direction.

3. The roof locking apparatus for a vehicle according to claim 1, characterized in that:

said rail is provided in said vehicle body in a region opposed to said front end of said roof in the middle portion with respect to the vehicle width direction within said storage space.

4. The roof locking apparatus for a vehicle according to claim 1, wherein: said grip member comprises: a slider including a right and a left side plates, an internal slider provided between said side plates of said slider and including a right and a left side plates; and a hook rotatably supported around a first revolving shaft extending in the right-left direction between said side plates of said internal slider and also rotatably supported around a second revolving shaft extending in the right-left direction between said plates of said slider, said hook adapted to shift between a gripping mode for gripping said roof between said slider and said hook and a grip-disengaging mode for releasing said roof from the gripped condition by rotating said hook in a positive or inverse direction around said second revolving shaft;

said rail is configured to allow said slider to move in the up-down direction between said gripping position and said holding position;

said spring is provided between said internal slider and a bottom of said rail and comprises a main spring for moving said grip member in the up-down direction between said gripping position and said holding position and a secondary spring provided above said main spring and for shifting said hook between said gripping mode and said grip-disengaging mode; and said push-pull cable has one end attached to said internal slider, said roof locking apparatus for a vehicle characterized in that:

to retract said roof into said storage space, said push-pull cable is driven by said cable drive mechanism to carry out the pulling operation so that said internal slider is pulled down by said push-pull cable against an elastic force of said secondary spring to rotate said hook in the positive direction around said second revolving shaft and to thereby shift the same from said grip-disengaging mode to said gripping mode, and then after said grip member having gripped said roof in said gripping position, said push-pull cable is driven to move said grip member with said roof gripped thereby against an elastic force of said main spring along said rail from said gripping position to said holding position, where said grip member with said roof gripped thereby is held, while on the other hand, to get said roof retracted in said storage space out of said storage space, said push-pull cable is driven by said cable drive mechanism to carry out the pushing-out operation so that said grip member with said roof gripped thereby is moved by the elastic force of said main spring along said rail from said holding position to said gripping position, and then said internal slider is pushed up by the elastic force of said secondary spring to rotate said hook in the inverse direction around said second revolving shaft to thereby shift the same from said gripping mode to said grip-disengaging mode, allowing said roof to be released from the gripped condition by said grip member in said gripping position.

5. The roof locking apparatus for a vehicle according to claim 4 characterized in that:

said main spring has a spring constant higher than that of said secondary spring.

6. The roof locking apparatus for a vehicle according to claim 1 characterized in that:

said roof locking apparatus further comprises a stopper provided on said rail and for restricting positioning of said grip member between said gripping position and said holding position.

* * * * *

UNITED STATES PATENT AND TRADEMARK OFFICE
CERTIFICATE OF CORRECTION

PATENT NO. : 8,070,218 B2
APPLICATION NO. : 12/294942
DATED : December 6, 2011
INVENTOR(S) : Frank Hinrichs and Tomoaki Matsunobu It is certified that error appears in the above-identified patent and that said Letters Patent is hereby corrected as shown below:

Title Page 2, item (56) References Cited

U.S. PATENT DOCUMENTS should read as follows:

2004/0262943 A1   12/2004   Kubota

Signed and Sealed this
Twelfth Day of February, 2013

Teresa Stanek Rea
*Acting Director of the United States Patent and Trademark Office*